United States Patent [19]

Ayres

[11] 3,935,113

[45] *Jan. 27, 1976

[54] SERUM/PLASMA SEPARATOR WITH CENTRIFUGAL VALVE

[75] Inventor: Waldemar A. Ayres, Rutherford, N.J.

[73] Assignee: Becton, Dickinson and Company, East Rutherford, N.J.

[ * ] Notice: The portion of the term of this patent subsequent to Nov. 12, 1991, has been disclaimed.

[22] Filed: Feb. 27, 1974

[21] Appl. No.: 446,364

[52] U.S. Cl. .......................... 210/516; 210/DIG. 23

[51] Int. Cl.[2] .......................... B01D 21/26

[58] Field of Search ....... 23/230 B, 258.5, 259, 292; 128/214 R, 218 M, 272; 210/83, 84, 131, 359, 514–518, DIG. 23, DIG. 24; 233/1 A, 1 R, 26

[56] References Cited

UNITED STATES PATENTS

| | | | |
|---|---|---|---|
| 2,577,780 | 12/1951 | Lockhart | 128/272 X |
| 3,326,215 | 6/1967 | Sarnoff et al. | 128/218 M |
| 3,508,653 | 4/1970 | Coleman | 210/DIG. 23 |
| 3,647,070 | 3/1972 | Adler | 210/83 |
| 3,741,400 | 6/1973 | Dick | 210/DIG. 23 |
| 3,814,248 | 6/1974 | Lawhead | 210/83 |
| 3,849,072 | 10/1974 | Ayres | 23/259 |

*Primary Examiner*—Frank A. Spear, Jr.
*Assistant Examiner*—Robert G. Mukai
*Attorney, Agent, or Firm*—Kane, Dalsimer, Kane, Sullivan and Kurucz

[57] ABSTRACT

An evacuated tube having both ends closed has a ball actuated resilient aperture type valve fixedly disposed between the ends for dividing the tube into upper and lower chambers. The valve is formed and arranged to provide a passageway between the upper and lower chambers when opened by the ball subjected to a centrifugal force of proper intensity and direction. Upon cessation of the force, the valve closes to provide a separation between the upper and lower chambers.

2 Claims, 2 Drawing Figures

SERUM/PLASMA SEPARATOR WITH CENTRIFUGAL VALVE

BACKGROUND OF THE INVENTION

1. Field of the Invention

The present invention relates to separators and more particularly to a device for separating blood plasma from cellular material of the type disclosed in commonly assigned application Ser. No. 247,483, filed Apr. 25, 1972, now U.S. Pat. No. 3,849,072.

2. Description of the Prior Art

With the development of modern pathological laboratories, it has become the common practice to send blood samples to a centralized laboratory facility for analysis. The normal procedure requires that the patient's blood sample be taken at a doctor's office or a clinic and thereafter mailed in a proper container to a centrally located laboratory to be tested. In many instances, it is desirable that the cellular material contained in a blood sample be separated from the blood plasma shortly after the sample is taken from the patient and prior to mailing. Centrifuging has become the accepted method for separation of the suspended cellular material from the blood plasma.

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064; 3,661,265; 3,355,098; 3,481,477; 3,512,940 and 3,693,804. In all of these devices the serum is collected in a blood collection container and means are provided for separating the plasma or serum phase from the cellular phase employing filters, valves, transfer tubes or the like.

It is also known to provide assemblies for the sealed separation of blood in which a piston is actuated by centrifugal force such as is disclosed in U.S. Pat. Nos. 3,508,653 and 3,779,383. These devices use either a distortable piston made of a resilient material or valve means associated with the piston to affect a sealed separation after centrifugation.

SUMMARY OF THE INVENTION

The present invention contemplates an evacuated tube having closed ends and a valve fixedly disposed between the ends to divide the tube into upper and lower chambers. The valve includes an elastomeric body having a centrally located stretchable diaphragm with a plurality of normally closed apertures. A ball, preferably of stainless steel, is disposed in the upper chamber adjacent the diaphragm.

The tube used has an open upper end being closed with a penetrable stopper. The tube is evacuated through the upper end so that the upper chamber is evacuated first. A pressure differential is developed across the diaphragm which causes the elastomeric members to be stretched upwardly to open its apertures. The upper and lower chambers come into communication so that the lower chamber is also evacuated.

The tube is filled with blood by puncturing the stopper disclosed in the upper end of the tube and the vacuum in the upper chamber draws blood into the tube in a manner well known to the art. As the upper chamber is filled with blood, a pressure differential is developed across the diaphram which will force it downwardly to open the apertures thereby causing the blood to flow into the evacuated lower chamber. Thus, the entire container is filled with a blood sample.

Upon subsequent centrifuging, the heavy ball is forced against the elastomeric diaphragm which stretches causing the apertures to open to connect the upper and lower chambers so that the heavier blood cells flow in a downwardly direction causing the lighter plasma to be displaced into the upper chamber of the tube.

When centrifuging is discontinued, th elastomeric diaphragm assumes normal position whereby its apertures are closed to provide a seal between the cellullar material and the plasma.

The primary objective of the present invention is to provide an improved device that may be used to collect a blood sample from a patient, separate the blood sample into its constituents, and maintain the constituents separate all at reduced costs.

The foregoing objectives and advantages of the invention will appear more fully hereinafter from a consideration of the detailed description which follows, taken together with the accompanying drawings, wherein two embodiments of the invention are illustrated by way of example. It is to be expressly understood, however, that the drawings are for illustrative purposes only and are not to be considered as defining the limits of the invention.

DETAILED DESCRIPTION OF THE INVENTION

Figure 1:
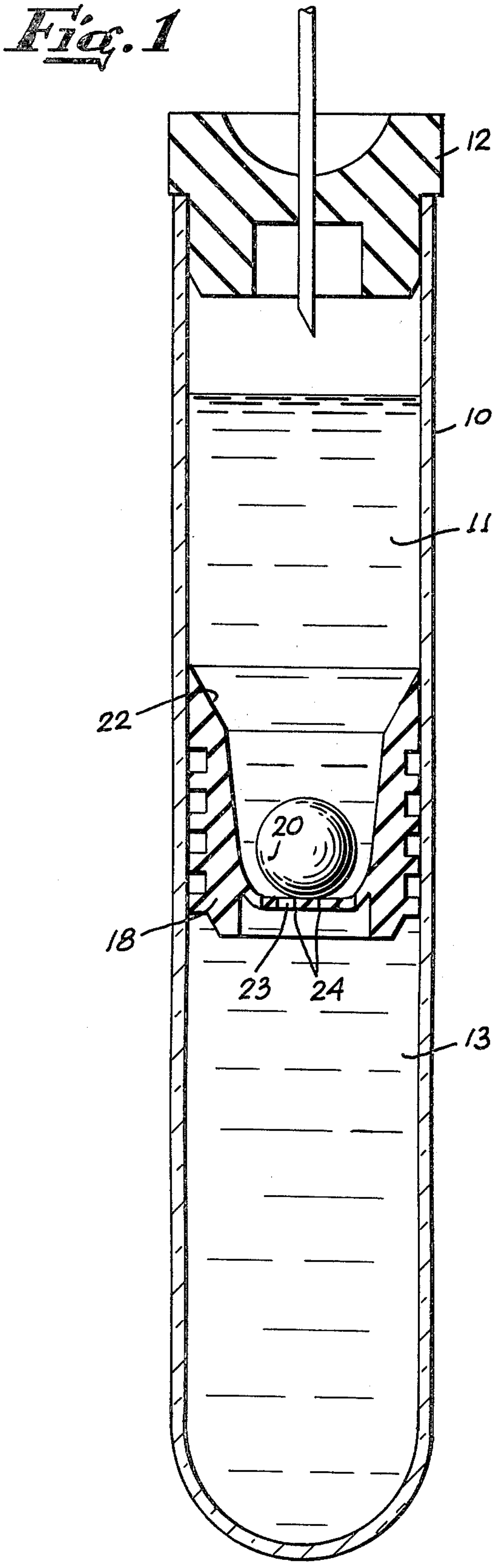
FIG. 1 is a longitudinal section of a separator device of the present invention containing blood prior to centrifugation and separation with the gravity operated valve in closed position.
Figure 2:
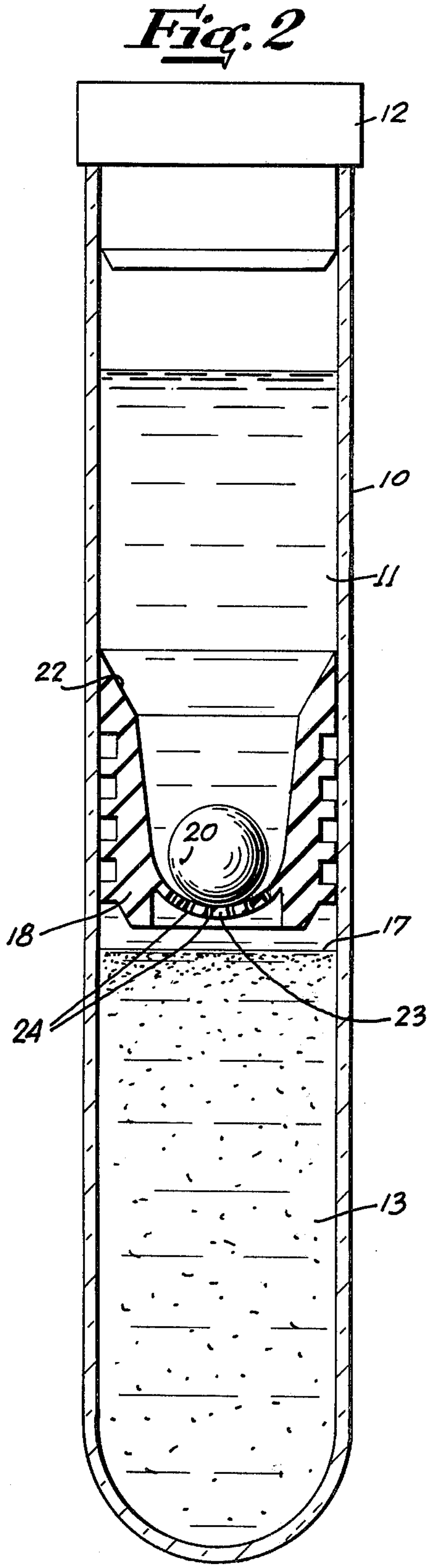
FIG. 2 is a similar view with the valve open upon centrifugation and incidnet to separation.

Referring to FIG. 1 there is shown a glass tube 10, having an upper opening closed by stopper 12 preferably resilient and penetrable by a cannula for purposes of evacuating or filling the tube. A centrifugally actuaged valve 18 is properly positioned within tube 10 to divide the tube into an upper chamber 11 and a lower chamber 13.

It is to be understood that the valve could be positioned in many ways well known in the art as discussed in the above referenced application. The fit between the valve and the inside diameter of the tube is of sufficient tightness so that once the valve is forced into a particular position during assembly the frictional forces between the valve and the tube will retain the valve at the desired position during its life including periods of centrifuging.

The valve is positioned so that it is slightly above an interface 17 that is formed between the plasma and the cellular material of the blood during centrifuging. This is essential so that the plasma remains free of cellular material.

Valve 18 is made of an elastomeric material such as an inert rubber or plastic material. A ball 20 is associated with valve 18 on the upper chamber 11 and is formed of one of a variety of materials having a specific gravitiy greater than the heavy phase of blood, which is approximately 1.09. The material from which the ball is manufactured must be chemically inert with blood and the preferred materials are glass, ceramic or stainless steel.

Valve 18 has a conical-shaped upper surface 22 forming a funnel. A diaphragm 23 extends across and is located at the base of the funnel and is formed with normally closed apertures 24. This diaphragm is formed of a thin, stretchable or resilient material. The upper periphery of surface 22 terminates in a feather edge which seals against the inner surface of tube 10 to facilitate unrestricted flow of cellular material through the valve during centrifuging and to prevent cellular material from being caught between the valve and the inner surface of the tube.

When the tube is to be filled with a blood sample, stopper 12 is punctured with a pointed cannula connected with a patient so that blood is drawn into the evacuated upper chamber. As the upper chamber fills with blood, a pressure differential is created across diaphragm 23 causing it to be displaced downwardly thereby opening apertures 24. The opening of the apertures 24 allows blood to flow into the lower chamber so that the entire tube is filled with the blood sample.

In order to separate the plasma from cellular material, the entire device is centrifuged so that centrifugal force is exerted in the direction of the tube base. Since ball 20 has a specific gravity greater than blood, the ball is urged in a downwardly direction stretching diaphragm 23 and opening apertures 24 so that a passage is formed between the upper and lower chambers. The heavier red blood cells flow in a downwardly direction displacing the plasma in the lower chamber so that it flows in an upwardly direction into the upper chamber until a plasma-cellular interface 17 is established below valve 18. When interface 17 is established, centrifuging is stopped and diaphragm 23 contracts causing apertures 24 to close, thereby creating a permanent separation between the upper and lower chambers.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A separator device for separating mixed light phase and heavy phase constituents of blood and establishing a permanent barrier between said phases, including:

a tubular container closed at both ends, one of said ends being closed with a stopper penetrable by a needle for the introduction of blood into said container;

elastomeric barrier means fixedly located intermediate the container ends and dividing the container into first and second chambers such that upon separation of the blood into the light phase and the heavy phase by the application of centrifugal force, the first chamber contains only the light phase;

a passageway through the barrier means connecting the first and second chambers;

a ball in said first chamber having a specific gravity greater than the heavy phase of the blood; and a stretchable diaphragm integral with the base of the barrier means and extending across the passageway, at least one normally closed aperture in the diaphragm, the diaphragm normally sealing off the passageway to provide a barrier between first and second chambers, and when subjected to a predetermined centrifugal force, the ball causes the diaphragm to stretch in the direction of the second chamber to open the apertures to provide communication between the chambers to permit the light phase to travel to the first chamber and the heavy phase to travel to the second chamber, and upon cessation of the applied centrifugal force, the diaphragm returns to its normal unstretched position to close the apertures and seal off the passageway and provide a barrier between the first and second chambers; said ball normally resting on the upper surface of said diaphragm.

2. The invention in accordance with claim 1, wherein the barrier means includes a conical surface, adjacent the first chamber, which forms a funnel that is in communication with the passageway to facilitate the separation of the phases and the flow of the heavy phase into the second chamber.

* * * * *